United States Patent Office 3,044,849
Patented July 17, 1962

3,044,849
PREVENTION OF SETTLING OF URANIUM PULP BY POLYVINYL ALCOHOL
Frederick W. Matthews and Max Morf, St. Hilaire, Quebec, Canada, assignors to Canadian Industries Limited, Montreal, Quebec, Canada, a corporation of Canada
No Drawing. Filed Sept. 14, 1959, Ser. No. 839,562
Claims priority, application Canada Oct. 11, 1958
2 Claims. (Cl. 23—14.5)

This invention relates to the extraction of uranium from its ores and, more particularly, to the prevention of settling of the pulped ore during the leaching thereof.

Many uranium ores contain the uranium in such forms as uranium titanite, uraninite and pitchblende dispersed as fine particles through an essentially quartzite matrix. The amount of $U_3O_8$ may range, for example, from 2.0 to 20.0 pounds per ton of ore. To extract the uranium, the ore is first crushed, and then ground under water until about 55% of the ore passes a 200 mesh screen. This finely divided ore, when slurried in water, is normally known as uranium pulp, and in the next stage of the process, the pulp is brought to 60%–70% solids and leached with sulphuric acid under oxidizing conditions. It is with this leaching step that this invention is concerned.

The leaching is normally done in a wooden stave or rubber lined tank or series of tanks measuring roughly 30 ft. deep by 32 ft. in diameter. The pulp is brought into contact with sulphuric acid of about 5% strength containing a small amount, viz. 2–3 pounds per ton of ore, of sodium chlorate at a temperature of about 45° C. The leaching is continued for about 48 hours and the uranium becomes oxidized to the uranyl state and remains in solution, probably as uranyl sulphate. It is vital to the success of the leaching process that the pulp, containing for example 65–68% solids, be kept in motion by constant stirring and in some cases by compressed air blown through the pulp. Very large and powerful stirrers are used, and there has been in the past considerable loss and damage caused by the tendency of the pulp to settle from the liquor as a semi-solid mass. Such settling may overload the motor or bend the stirrers, and is particularly likely to occur at any interruption of the electrical power or compressed air supply. Once the pulp has settled and the damage is done, the tank must be emptied by removal of all pulp and lengthy and costly mechanical repairs may follow. Moreover, this tendency to settle increases the power requirements of the stirrer by a large factor.

In order to decrease the danger of such settling, it has become common practice to incorporate a suspending agent in the pulp during the leaching procedure, the preferred agent having heretofore been animal glue. The glue is usually added with the sodium chlorate, since on the initial addition of sulphuric acid to some uranium ores there is emission of hydrogen sulphide, i.e. the conditions are reducing. The pulp is air blown until the hydrogen sulphide is drawn off and the sodium chlorate and glue are then added. Initially about 0.3 lb. glue are added per ton of ore.

By the term "suspending agent" as used herein is meant an agent which not only slows down the settling of the pulp from the leaching liquor but also changes the nature of the semi-solid mass if it should be allowed to settle. In the absence of a suspending agent the settled mass is hard like wet sand but in the presence of an effective agent the mass is much less dense and is capable of being stirred into suspension again with little effort.

However, experience has shown that glue is not stable under the acid oxidizing conditions prevailing during the leaching process. Moreover, even in the presence of glue, the tendency of the pulp to settle increases as the leaching progresses. It has thus become common practice to add more glue during the leaching process so as to bring the total amount between 1.0 and 2.0 lbs./ton ore, which adds appreciably to the cost of uranium processing in view of the small amount of uranium in each ton of ore.

It is the primary object of this invention to overcome the foregoing disadvantages by providing a new suspending agent for the uranium pulp, which agent is more effective than the animal glue and is also more stable under the leaching conditions. Other objects of the invention will appear hereinafter.

Broadly speaking, these subjects are accomplished by incorporating polyvinyl alcohol with the pulp in a concentration of at least 0.01 pound per ton of uranium ore contained in the pulp.

The effectiveness of the polyvinyl alcohol as suspending agent does not appear to be dependent to a great extent on its molecular weight or hydroxyl content, having regard to the fact that polyvinyl alcohol is produced by hydrolysis of polyvinyl acetate. Thus, the following commercial grades of polyvinyl alcohol were tested and all found to be effective for the purpose of the invention.

| Viscosity in centipoises of 4% aqueous solution at 20° C. | Degree of Hydrolysis, percent |
|---|---|
| 55–65 | 99–100 |
| 45–55 | 97.9–98.7 |
| 35–45 | 86–89 |
| 28–32 | 99–100 |
| 23–28 | 97.9–98.7 |
| 19–25 | 86–89 |
| 4–6 | 98.5–100 |
| 1.3–2 | 77–72.9 |

The solid ponyvinyl alcohols of 99–100% degree of hydrolysis and medium or high viscosity dissolve slowly in the leaching solution and it is preferable that they be incorporated with the pulp in the form of aqueous solutions of any convenient strength, rather than in solid form.

The invention will be more fully illustrated by the following example which, however, its not intended to limit the invention.

EXAMPLE

A simple test was devised for comparing the effectiveness of various suspending agents. This test consists in pouring a sample of the pulp containing the leaching chemicals and particular suspending agent into a wide bore powder funnel of specified dimensions. The bore of the funnel is plugged at the bottom with a rubber stopper and the pulp allowed to settle for 15 minutes. The stopper is then removed and the time for the contents of the funnel to flow out is noted. This time is an excellent measure of the tendency of the pulp to settle, and the size of the funnel and its bore may be varied to measure this tendency over several ranges. Thus a pulp which is effectively suspended by either glue or polyvinyl alcohol may flow out of a given funnel in 5–7 seconds but a pulp with no agent or in which the agent has become ineffective will not flow out of the same funnel at all.

Various suspending agents were incorporated with separate samples of a uranium pulp containing 68% solids to which were added 4 cc. of sulphuric acid and 0.5 g. of sodium chlorate per 200 g. of ore. Each sample was stirred and brought to 45° C. and tested by the above method using a funnel with a 1.3 cm. diameter bore.

Since high molecular weight glues are more effective than those of low molecular weight, a glue of the former type was compared with three samples of polyvinyl alcohol with the results shown in Table I.

Table I

| Leaching Time (Hours) | Flow-Out Test Time (seconds) | | | |
|---|---|---|---|---|
| | Glue | Polyvinyl Alcohols | | |
| | | 1 | 2 | 3 |
| 0 | 7 | between 5 and 10 | | |
| 3.45 | 28 | | | |
| 5.08 | 31 | | | |
| 6.00 | ∞ | | | |
| 48.0 | ∞ | 15 | 9 | 15.5 |

The concentration of glue was 0.3 lb./ton which corresponds to the first addition in a leaching process, while that of polyvinyl alcohol was only 0.05 pound per ton of ore. It can thus be seen that the effectiveness of the glue was lost in 6 hours, and therefore more glue must be added in practice, whereas the polyvinyl alcohol was still effective after 48 hours, the usual total leaching time.

A similar experiment was conducted to establish the effect of decreasing amounts of polyvinyl alcohol. In this case the polyvinyl alcohol had a viscosity of 19–25 and a degree of hydrolysis of 86–89%. The results of the experiment are given in Table II.

Table II

| Concentration of Polyvinyl Alcohol (lbs./ton of ore) | Test Time of Two Samples (seconds) | |
|---|---|---|
| 0.05 | 10 | 8 |
| 0.04 | 15 | 16 |
| 0.03 | 16 | 18 |
| 0.02 | 18 | 20 |
| 0.01 | 55 | 63 |

It is permissible to add the polyvinyl alcohol at the beginning of the leach, and no deleterious effect is occasioned thereby.

It should be noted that a greater quantity of polyvinyl alcohol than those above in Table II can be used for particularly difficult ores. It is economically desirable to use the minimum effective amount of suspending agent, but the process of this invention is not to be limited to small amounts shown in the example, but only by the following claims.

What we claim is:

1. In a process wherein finely ground uranium ore is slurried with dilute sulphuric acid and leached under oxidizing conditions, the improvement which comprises incorporating with the slurry at least 0.01 lb. of polyvinyl alcohol per ton of ore.

2. The improvement claimed in claim 1 wherein a polyvinyl alcohol having a viscosity of at least 25 centipoises in 4% aqueous solution and a degree of hydrolysis of at least 99% is incorporated with the slurry in the form of an aqueous solution.

References Cited in the file of this patent

UNITED STATES PATENTS

| 2,738,253 | Thunaes et al. | Mar. 13, 1956 |
| 2,868,618 | Oberg et al. | Jan. 13, 1959 |

OTHER REFERENCES

Rosenbaum et al.: "Int. Conf. on Peaceful Uses of Atomic Energy," vol. 8, pages 38–44, August 8–20, 1955.

Kirk and Othmer: "Encyclopedia of Chemical Technology," vol. 14, pages 713, 715.